Figure 1:
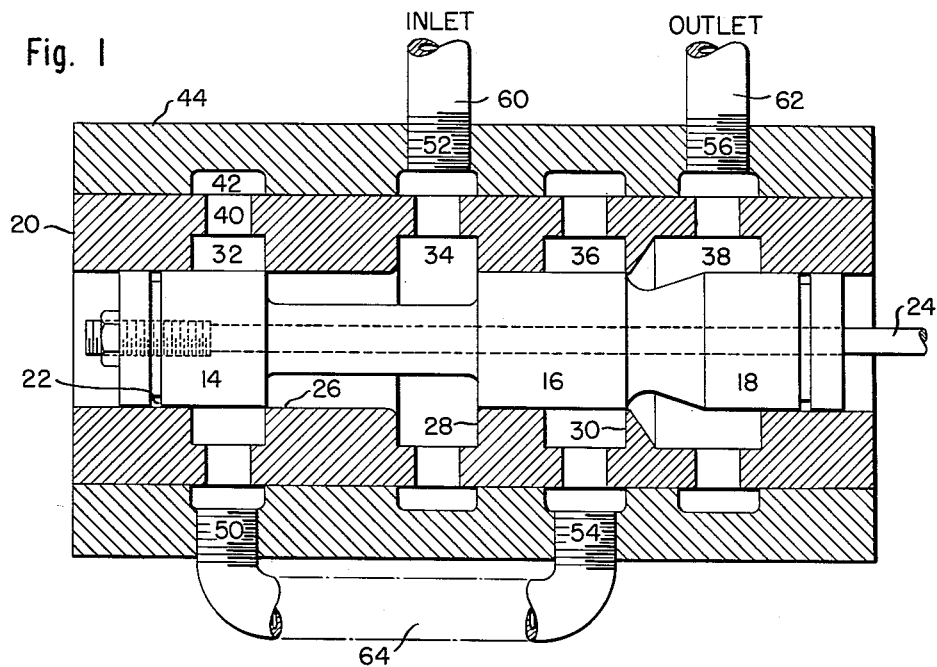

May 29, 1956

SHIH-YING LEE 2,747,612

FORCE-COMPENSATED FLOW VALVE

Filed April 24, 1951

2 Sheets-Sheet 1

INVENTOR
SHIH-YING LEE

BY Henway, Jenney, Witter
& Hildreth,
ATTORNEYS

May 29, 1956  SHIH-YING LEE  2,747,612
FORCE-COMPENSATED FLOW VALVE
Filed April 24, 1951  2 Sheets-Sheet 2

INVENTOR
SHIH-YING LEE
BY Kenway, Jenney, Witter
& Hildreth,
ATTORNEYS

United States Patent Office 2,747,612
Patented May 29, 1956

2,747,612

FORCE-COMPENSATED FLOW VALVE

Shih-Ying Lee, Arlington, Mass., assignor to Research Corporation, New York, N. Y., a corporation of New York Application April 24, 1951, Serial No. 222,591

3 Claims. (Cl. 137—622)

The present invention relates to flow valves, and is concerned more particularly although by no means exclusively with improvements in flow-control valves of the multiple-orifice type.

For many applications, particularly in the field of servomechanisms, there is need of a valve which will readily control the flow of high pressure fluid while requiring only slight force to actuate the valve. Such valves are generally of the type wherein a piston is axially slidable within a sleeve or cylinder, the piston and sleeve having cooperating lands to define a plurality of flow-controlling orifices or ports, with the piston exposed to the fluid pressure in such a way as to provide static balance when the valve is closed.

In conventional hydraulic flow valves of the above type, having square-edged lands, the flow of oil through the orifices when the valve is open produces a net force which tends to close the valve. As a result, even though the valve is nominally balanced under static conditions, an appreciable force may be required to open the valve and to maintain the valve in the desired position during the flow of fluid. Such actuating force or stroking force is a function of pressure and flow, with the result that unbalance under flow conditions presents a serious obstacle to the development of servomechanisms of high power sensitivity. Such servos usually involve a combination of hydraulic and electronic systems, with the hydraulic control valve stroked by an electromagnetic torque motor driven by vacuum tubes. The use of vacuum tubes makes it desirable to keep the power input to the torque motor down to a few watts or less, and this restriction and the large force required to stroke a square-land piston have in the past limited the outputs of single stage valves to about one horsepower; higher outputs have required the use of two or more valves cascaded.

In an effort to avoid the use of additional stages, attempts have been made to reduce stroking force, so that the valve may be substantially balanced under flow conditions as well as under static, no-flow conditions. These prior attempts, however, have not resulted in valves which exhibited satisfactory balance over useful ranges of pressure and flow.

It is therefore an object of the present invention to provide a valve construction wherein the stroking forces may be markedly reduced, so as to permit the valve to be actuated by relatively slight stroking forces over a wide range of flow and pressure conditions. It is a further object of the invention to provide such valve in a form which may be readily manufactured, and which presents no greater difficulties from the standpoint of tolerances and details of assembly than are encountered with conventional valves having the usual square-edged lands.

In accordance with the foregoing, a feature of the invention involves the provision of a valve having a port or orifice configuration such that the stroking force may be reduced substantially to zero, or even made to have appreciable negative values. Thus, the novel port configuration, in a form which provides a slight positive force characteristic, may be employed in a single-orifice valve for simple flow control by control means operating at low energy levels. Alternatively, for applications where a multiple orifice or four-way type of control valve is preferable, as in servomechanism applications, a port configuration that gives rise to a substantial negative stroking force may be employed, in conjunction with a conventional square-land orifice in another portion of the valve, the negative force characteristic being such as to balance, as closely as may be desired, the positive force characteristic of the square-land port.

More specifically, the invention relates to a valve construction wherein a flow-controlling port or orifice may be so shaped that the axial component of efflux of momentum from the downstream chamber of said port may be made equal to or even appreciably greater than the influx (contrary to the condition existing at a conventionally shaped valve port). In the case of a control valve employing two flow-controlling orifices in series, one orifice will be of this special configuration, with the axial component of efflux of momentum from the downstream chamber appreciably greater than the influx to said chamber, so that a negative force is developed at said orifice sufficient to balance out as closely as may be desired the positive or closing force developed at a conventional square-land orifice at another portion of the valve. Indeed, it has been found possible to provide multi-port or four-way valves in which, except at very small openings, the two forces can be balanced very exactly over a wide range of fluid pressures and flow rates, so as to permit, by way of example, the control of a valve of three or four horsepower rating with a power input of only a few watts. In view of the fact that for most servomechanism applications the multi-port type of valve is required, having two flow-controlling orifices in series, the invention will be illustrated and described primarily in terms of such valves. However, it is to be understood that the special negative-force port configuration may be adapted, as will hereinafter appear, to a single-orifice valve having a substantially reduced stroking force characteristic as compared with a valve employing a conventional square-land orifice.

Figure 2:
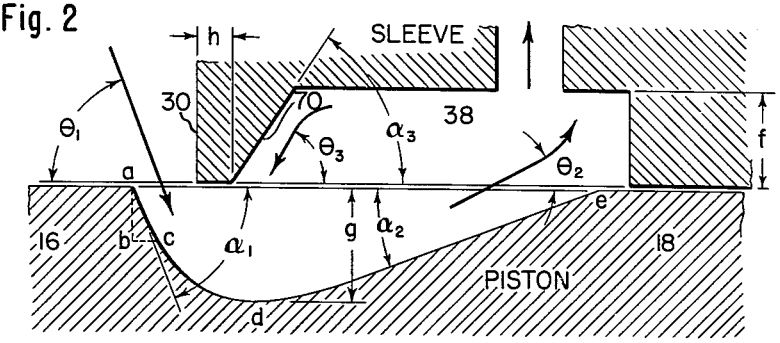
Figure 3:
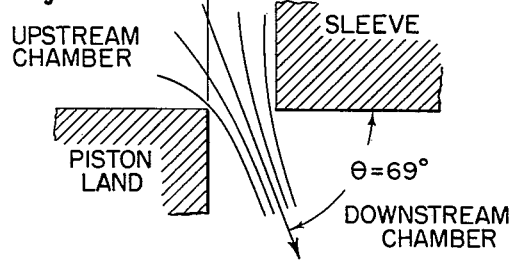
Figure 4:
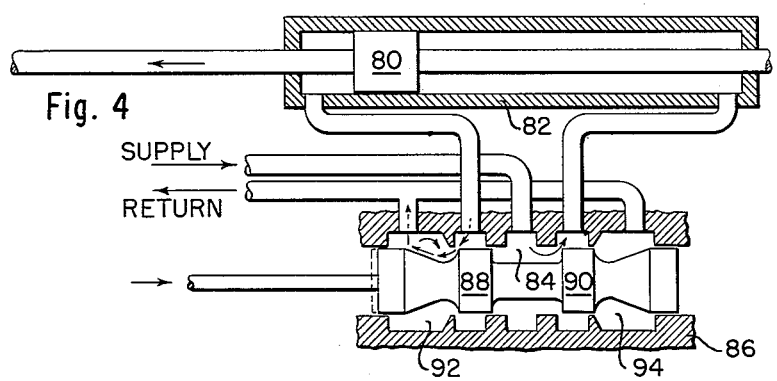
Figure 5:
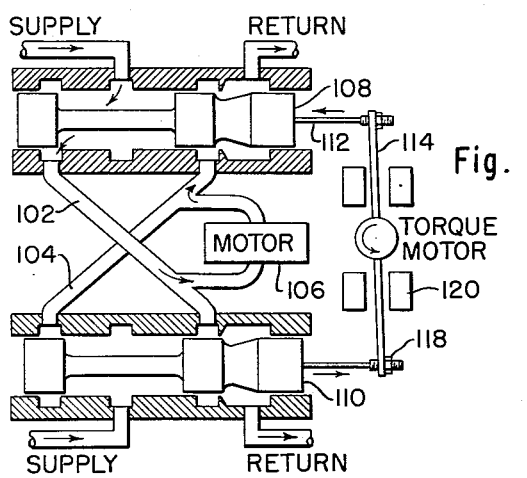
Figure 6:
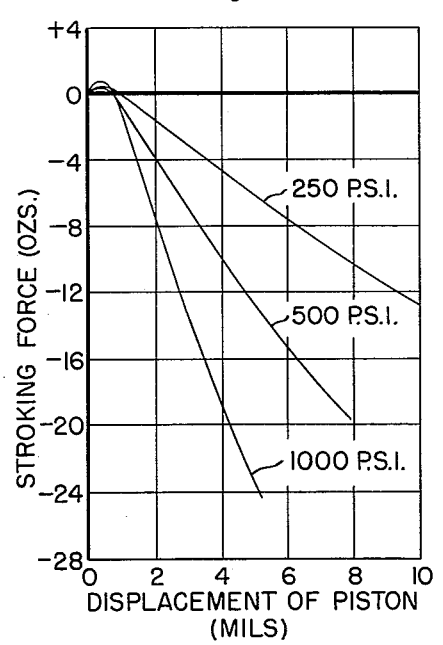
Figure 7:
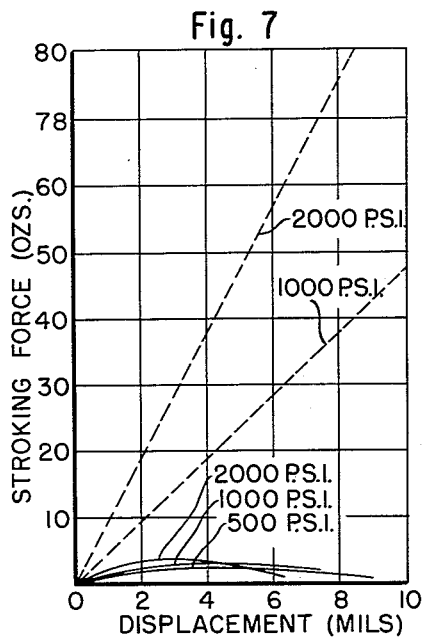

In the drawings illustrating the invention, Fig. 1 is a sectional view showing a single acting four-way valve embodying the special negative-force port of the invention; Fig. 2 is an enlarged sectional detail of the novel land configuration of said port, the parts being shown with the orifice open and with the flow pattern indicated by arrows; Fig. 3 is a diagrammatic view illustrating the flow pattern at an open orifice having square-edged lands; Fig. 4 is a sectional view of a double acting four-way valve embodying the invention, shown in association with a hydraulic motor; Fig. 5 is a diagrammatic view illustrating the invention as embodied in a twin-piston arrangement for the control of a hydraulic motor from a torque motor operating at very low energy level; Fig. 6 is a plot of curves taken at various fluid pressures, showing stroking force in terms of piston displacement, for the negative force portion of the valve, and Fig. 7 is a plot showing a comparison of the net stroking force for a typical square land valve (dashed line) and for a valve of comparable rating and embodying the invention (solid line), at representative pressures.

A multi-port valve embodying the invention is shown in Fig. 1 of the drawings, wherein the valve piston, comprising lands 14, 16 and 18, is axially slidable within the sleeve 20. At its ends the piston is provided with the usual equalizing grooves 22. A rod 24 serves to position the piston within the sleeve, the rod being connected to suitable actuating means such as a torque motor (see Fig. 5) by which electrical signals are converted into mechanical displacement to control the flow of hydraulic fluid through the valve.

Intermediate the sleeve lands 26, 28, 30 the sleeve is provided with annular chambers 32, 34, 36, and 38. These chambers communicate by means of radial openings 40 with annular chambers 42 in the valve block 44 within which the valve sleeve 20 is mounted. The chambers 42 in block 44 make connection with the piping by which the valve is connected into the system. Passage 52 constitutes the inlet and is connected by pipe 60 to the source of fluid under pressure. Passage 56 serves as the discharge or outlet and communicates by pipe 62 with the sump or reservoir. Passages 50 and 54 may communicate with the hydraulic motor under the control of the valve, or they may be interconnected by pipe 64 as illustrated in case the valve is to be employed for simple flow control.

Static balance of the valve under no-flow condition is attained in the conventional manner by reason of the exposure of piston lands 14 and 16 to the supply pressure. As these lands are of equal diameter and are exposed to equal but oppositely directed fluid pressure, there is no net force tending to move the piston in either direction under the influence of the supply pressure.

When the piston is moved to the left to open the valve and permit the flow of fluid from inlet to outlet, the high pressure oil or other fluid, flows into chamber 32 through the annular orifice formed by piston land 14 and the adjacent corner of sleeve land 26. Thence, by passage 50 and pipe 64 the oil flows into chamber 36. From this chamber the oil flows through another annular orifice formed by piston land 16 and sleeve land 30 into chamber 38 and thence to outlet 56 and return line 62.

The valve thus consists of two ports or orifices in series, with both orifices being opened and closed simultaneously upon axial movement of the piston within the sleeve. Such arrangement permits a substantial reduction in actuating force, and conventional balanced valves employing two orifices in series and making use of square-edged lands have been extensively employed in hydraulic apparatus and particularly in servomechanisms.

In the illustrative embodiment, however, it will be observed that the two orifices are not similar. The upstream orifice is of the usual so-called square-edged configuration; the downstream orifice is of special configuration and will hereinafter be referred to as the negative-force port. Before describing the special configuration of this port and its mode of operation, it will be helpful to consider the forces which arise when fluid flow takes place through the conventional form of orifice.

In carrying out an analysis of the flow through an idealized square-edged orifice of zero radial clearance, it has been established that the flow pattern resembles that shown in Figure 3, if certain justified assumptions are made, i. e., that the peripheral width of the orifice is large compared to the displacement or gap $x$, and that the flow is laminar and non-viscous. Over a small region upstream from the orifice, the flow is obviously strongly convergent and is therefore substantially laminar, while tests have indicated that the viscosity of oils of the type normally employed in hydraulic control systems does not appreciably influence the results in respect to flow characteristics. A determination of the flow pattern at the orifice, based on the configuration of the chamber upstream from the orifice, reveals that the angle $\theta$ which the axis of the stream makes with the piston axis is substantially 69 degrees, as shown in Figure 3.

The axial force on the piston (or the sleeve) is the axial component of the net rate of efflux of momentum through the orifice. For a properly designed valve, the areas of the upstream and downstream chambers are very large compared to that of the orifice itself. Since the velocities are inversely proportional to the areas, the entering and outgoing momenta are negligibly small and hence the momentum of the oil flowing through the orifice must be imparted to it by the walls of the upstream chamber and must be given up to the walls of the downstream chamber. The resulting axial component of the force is found to be proportional to the total rate of flow of fluid, the average velocity of the jet through the orifice, the density of the fluid, and the cosine of angle $\theta$.

In the case of a non-ideal orifice wherein the land edges are not ideally sharp and the radial clearance is finite, the angle $\theta$ will be less than 69 degrees and the axial force on the piston will be somewhat greater than for the ideal case shown in Figure 3, particularly at small openings of the valve.

This positive force, tending to oppose valve opening, and to close the valve under flow conditions, arises at both orifices of a conventional four-way valve and is additive with the result that appreciable stroking force is required to operate the valve over the ranges of displacement normally required for servomechanisms and other control purposes. For example, in Figure 7 are shown in dash-line curves of stroking force in ounces in terms of piston displacement in mils, representative of a typical valve having square-edged lands and operating at fluid pressures of 1,000 to 2,000 lbs. per square inch, respectively, the valve piston being of approximately three and one-half horsepower capacity at maximum output. It is seen that stroking forces as high as 60 to 80 ounces may readily be involved for displacements of less than 0.008 inch.

In accordance with the present invention, through the provision of the special configuration of piston and sleeve lands at the downstream orifice, it is possible to reduce the stroking force to a small fraction of that normally required. As will hereinafter more fully appear, the orifice construction is such that the axial component of efflux of momentum from the downstream chamber is made greater than the influx, with the result that a negative force is developed, tending to open the valve. This force, for a given pressure drop in the fluid, is proportional to the valve displacement or opening, and by suitable design, the negative force may be made such as to balance out almost exactly the positive force generated at the conventional square-land orifice in another part of the valve. Indeed, except at very small openings where the effects of radial clearance and slight rounding of the land edges upset the linearity, the negative and positive forces may be very accurately balanced, although in general it is preferable to design the valve to exhibit a slight positive force for the sake of stability of the system.

The configuration of the negative force port is best shown in Figure 2. The piston is provided, intermediate lands 16 and 18, with a chamber having a profile analogous to that of a turbine bucket. At land 16 the chamber profile slopes inwardly of the piston at an angle $\alpha_1$ to the piston axis, while at land 18 the profile slope is at a substantially smaller angle $\alpha_2$ to the piston axis. The chamber profile likewise includes a smooth curve at the bottom of the chamber, joining the two sloping portions.

As a result of this specially shaped piston chamber, the hydraulic fluid enters the chamber through the orifice between lands 16 and 30 at an angle $\theta$, and leaves the piston at a more gradual angle $\theta_2$. By making $\alpha_2$ considerably smaller than $\alpha_1$, the axial force component may be caused to have a substantial negative value, since $\cos \theta_2$ will be appreciably greater than $\cos \theta_1$.

The negative force resulting from this special piston shape is further increased by a return flow from the chamber 38 in the sleeve. This is accomplished by narrowing the land 30, and forming its downstream wall 70 at an oblique angle $\alpha_3$ to the valve axis. This serves to divert a portion of the oil flow toward the piston chamber at an angle $\theta_3$ to the valve axis. Preferably the width of land 30, shown as dimension $h$, will be relatively narrow, in order that the $\theta_3$ component of flow may enter the piston chamber close to the upstream end adjacent the orifice.

An expression for the total resultant force would be highly complicated, as it depends on numerous variables such as angles $a_1$, $a_2$, $a_3$, and on piston diameter and peripheral width of the port, as well as on oil viscosity and density. In practice, $a_1$ will be substantially 69°, whether the port extends entirely around the piston and sleeve, or occupies only a portion of the circumference, since it is desirable that $a_1 = \theta_1$ and $\theta_1$ will be very close to 69° in view of the square land 30. In most cases, $a_1$ may be varied through several degrees about the 69° value, without seriously disturbing the balance.

In general, the steepness of the negative-force characteristic will be controlled by the angle $a_2$, which may be modified to provide a characteristic which will most nearly offset the positive force characteristic of the square land orifice of the upstream port. Accordingly, $a_2$ may be varied over a relatively wide range depending on the characteristic desired; decreasing $a_2$ results in steepening the negative force-displacement characteristic, since cos $\theta_2$ will become considerably larger than cos $\theta_1$.

The angle $a_3$ at the downstream end of land 30 is not readily altered once the valve has been completed, hence it is generally desirable to make this angle some convenient angle, say 45°, and then depend on adjustment of $a_2$ for final balance. Other factors such as the depths $f$ and $g$ of the sleeve and piston chambers, and width $h$ of the flat end of land 30, are not susceptible to great modification; for maximum compensation, $f$ and $g$ will be as large as conveniently practical, while $h$ will be made small without reaching a surface so narrow as to be susceptible to erosion.

If desired for manufacturing convenience, the upstream end of the piston chamber, at land 16, may be machined with a slight square step shown somewhat enlarged for clarity in dotted line $abc$, without seriously disturbing the desired flow pattern so long as angle $eac$ is substantially equal to or slightly greater than 69°. Such step permits the axial distance from said corner to the upstream corner of land 14 to be more readily measured, if such distance is to be controlled by measurement instead of by actual flow tests.

A plot of the negative stroking force vs. piston displacement for the negative force port alone is shown in Figure 6 in the form of typical curves taken at various supply pressures as indicated. It will be observed that the force, except at very small values of valve displacement, is closely proportional to valve opening, for constant supply pressure. For very small openings, the force turns out to be slightly positive, rising to a maximum of a fraction of an ounce and then returning to zero at a displacement $x_0$. The displacement $x_0$ beyond which the negative, substantially linear force-displacement characteristic is manifested, is dependent on manufacturing tolerances, that is, on the radial clearance between spool and sleeve and the radius of curvature of the land profile at the edges, and is relatively small at readily attainable tolerances. The positive loop vanishes entirely for the condition of zero clearance between piston and sleeve and zero curvature of the land edges.

When a negative-force port is combined with a conventional square-land orifice in series therewith in another portion of the same valve, as shown in Fig. 1, the positive and negative forces may be caused to off-set one another to leave only a slight net positive force. In Figure 7 are shown typical curves for a representative valve of about three and one-half horsepower rating. It will be observed that for displacements up to 6 or 8 mils the stroking force is less than 5 ounces, while changing the working pressures from 500 up to 2,000 lbs. per square inch has little effect on the force required to operate the valve. For comparison, the stroking forces for valves of comparable power rating, having conventional square-land configuration, are shown in dashed line, for working pressures of 1,000 and 2,000 lbs. per square inch. It is seen that the square land valve may require forces up to 80 ounces while the compensated valve of the invention may be given a comparable displacement with a stroking force of the order of 2 or 3 ounces. It is evident from the curves that the maximum stroking force is very greatly decreased in the compensated valve at the larger displacements and at higher fluid pressures, where the force required to actuate an uncompensated valve is the greatest.

The improved valve construction is readily applicable to a double-acting or four-way valve for reversible flow control of fluid. Such a valve is shown schematically in Figure 4 as applied to the control of the position of a hydraulic ram or piston 80 within a cylinder 82. In this construction, the oil supply enters chamber 84 in sleeve 86 and then past square-edged orifice at land 88 or 90 to admit oil to one end or the other of power cylinder 82. The return fluid from the discharge end of the power cylinder passes through a negative-force port of the previously described configuration to enter either chamber 92 or 94 depending on valve position, after which the oil is carried by return pipe back to the sump or pressure source. Thus, motion of the valve spool toward the right serves to move the power piston 80 to the left, while motion of the valve spool to the left produces a motion of power piston 80 to the right, in each case the power piston motion taking place at a greatly amplified power level as compared with the stroking force required to position the valve spool of the control valve.

As an alternative to the double-acting or four-way valve arrangement shown in Figure 4, the twin piston construction shown in Figure 5 may advantageously be employed. This arrangement is particularly desirable when a compact system of rapid response is required, since the balanced relation of the two pistons makes possible a low total mass. In this arrangement, two single stage valves of the type illustrated in Figure 1 are employed. The supply and return lines of each valve may be connected to common supply and return mains, while the intermediate outlets are cross connected by piping 102, 104 which also communicates with the hydraulic motor 106 of any conventional type, for example the linear hydraulic ram shown schematically in Figure 4.

The individual pistons 108, 110 of the control valves are connected by links 112 to the opposite ends of a lever 114. The links may be in the form of wires of sufficient stiffness to transmit the rocking motion of lever 114 to the respective pistons, while possessing sufficient transverse yield to reduce binding of the pistons within the sleeves without requiring the use of pivotal connections. The relative axial positions of the valve pistons may be adjusted by means of the threaded fittings 118 which engage the rock lever 114.

The lever 114 is actuated to operate the valves by means of a torque motor or similar device customarily employed in servo-mechanisms to convert electrical signals of small magnitude into mechanical displacement, the field coils being indicated schematically at 120.

Because of the low stroking forces required by valves embodying the present invention, the valve arrangement shown in Figure 5, or the four-way valve shown in Figure 4 may be actuated by torque motors of relatively low power output, with the result that the overall system sensitivity may be substantially enhanced over conventional systems which either require a two stage hydraulic amplifier or a torque motor capable of generating stroking forces commensurate with the forces represented by the dashed lines of Figure 7.

It may be pointed out that the valve arrangement shown in Figure 5 possesses certain advantages over the combined four-way valve shown in Figure 4. Through the provision of the screw-threaded connections 118, the pistons may be accurately adjusted to a zero-lap position or to a predetermined slight overlap, so that only one piston may be valving oil at any one instant. The other valve will be closed and therefore will have zero force acting on it. If then the valves themselves are substantially balanced, through the combination of positive and negative force ports, so as to require a net stroking force of the order indicated by the solid lines of Figure 7, the link wires and the torque motor armature will not be subjected to any appreciable forces tending to distort the armature or buckle the wires.

For applications where the multi-port type of valve is not required, the special negative force port configuration may be modified to provide, in a single orifice valve, a stroking force characteristic that is very small, only slightly greater than zero. Such a valve could consist of the right-hand portion of Fig. 1, with passage 54 constituting the inlet and 56 the outlet. The single orifice would be that between chambers 36 and 38, and resembling in general the configuration shown in Fig. 2. In order to provide, for the sake of stability requirements, a slight positive stroking force rather than a negative force characteristic, the axial component of the efflux of momentum from the piston chamber into sleeve chamber 38 should be slightly less than the axial component of influx. Accordingly, the angle $\alpha_2$ of the downstream piston land should be increased, so as to be more nearly equal to $\alpha_1$, the effective angle at the upstream land. Also, the angle $\alpha_3$ of the upstream end 70 of chamber 38 may be increased, if desired, to reduce the upstream component of the reentrant flow angle $\theta_3$. By such modification the single orifice may be caused to have a substantially zero force characteristic, so as to make possible the provision of a relatively simple valve for flow-control applications not requiring a multiple-orifice type, while permitting the effective control of high-pressure flow from relatively low power actuating means.

There has thus been described, in advantageous but by no means exclusive embodiments, flow valves employing a special port configuration to provide a flow-controlling orifice which may be designed to provide a force-displacement characteristic that may be made close to zero, or may be caused to have substantial negative values, in terms of piston displacement. For multi-port valves, the use of an appropriately designed negative force port with a conventional square-edged port in another portion of the valve permits the positive force generated at said conventional port to be substantially offset by the forces developed at the negative force port over practically the entire operating range of the valve, so that the net operating force is but a fraction of that required in valves of conventional construction. It is apparent in addition that the improved results are attainable in a valve construction which may be readily realized in practical manufacture. While the ideally balanced valve is predicated on zero radial clearance and zero radius of curvature at the land edges, the effect of such clearances and curvatures as inevitably arise in practical manufacturing techniques is to disturb the linearity of the negative force port only in the region of very small displacements, and this departure from nonlinearity has no perceptible effect on the overall balance of the valve. It may also be pointed out that the relative balance between the positive and negative force ports is preferably so worked out that the valve exhibits a slight positive force over the operating range, this being desirable to minimize any tendency towards instability or self-oscillation of the valve and its actuating means.

While the invention has been described primarily in terms of valves of the type commonly employed in servomechanisms, this has been for purposes of illustration only, as such valves must possess very high control capability in terms of actuating force; nevertheless the invention is well adapted for valves of both the single and the multi-port type, for any applications where minimum actuating or operating force is a factor, such as remote control or other forms of indirectly actuated valves.

I claim as my invention:

1. A force-compensated flow valve comprising a valve body and a valve element movable therein, the valve body having inlet and outlet passages, inlet and outlet chambers in the body communicating with the inlet and outlet passages, lands between the chambers, the movable valve element having lands and chambers cooperating with the lands and chambers of the valve body to provide between chambers in the valve body a pair of flow-control orifices in series when the valve element is displaced from closed position, one of said orifices having square-edged lands possessing a positive force-displacement characteristic with valve opening, and the other of said orifices having a configuration to provide a force-displacement characteristic approximating in magnitude but opposite in direction to that of the first-mentioned orifice, said other orifice discharging into an adjacent chamber in the movable valve element and cooperating chamber in the valve body, the movable valve element having at the entrance to the said downstream chamber therein an inwardly sloping surface disposed at an angle approximating the direction of the fluid flow into said chamber from the adjacent orifice, and the movable valve element having at the end of said chamber remote from said orifice a surface inclined in the opposite direction to the entrance surface and at a substantially smaller angle than the angle of the entrance surface, so that the component of momentum in one direction of movement of the valve element, due to flow efflux from the chamber, is greater than the component of momentum in the other direction due to flow influx to said chamber.

2. A force-compensated flow valve comprising a valve body and a valve element movable therein, the valve body having inlet and outlet passages, inlet and outlet chambers in the body communicating with the inlet and outlet passages, lands between the chambers, the movable valve element having lands and chambers cooperating with the lands and chambers of the valve body to provide between chambers in the valve body a pair of flow-control orifices in series when the valve element is displaced from closed position, one of said orifices having square-edged lands possessing a positive force-displacement characteristic with valve opening, and the other of said orifices having a configuration to provide a force-displacement characteristic approximating in magnitude but opposite in direction to that of the first-mentioned orifice, said other orifice discharging into an adjacent chamber in the movable valve element and cooperating chamber in the valve body, the movable valve element having at the entrance to the said downstream chamber therein an inwardly sloping surface disposed at an angle approximating the direction of the fluid flow into said chamber from the adjacent orifice, the movable valve element having at the end of said chamber remote from said orifice a surface inclined in the opposite direction to the entrance surface and at a substantially smaller angle than the angle of the entrance surface, and the cooperating chamber in the valve body having at the end adjacent the orifice a surface sloping toward the movable valve element in the direction of the orifice, so that fluid is returned from the chamber in the valve body to the chamber in the movable valve element in the region adjacent said other orifice and at an angle having a flow component toward said orifice.

3. A force-compensated flow valve comprising a valve body and a valve element movable therein, the valve body having inlet and outlet passages, inlet and outlet chambers in the body communicating with the inlet and outlet passages, lands between the chambers, the movable valve element having lands and chambers cooperating with the lands and chambers of the valve body to provide between chambers in the valve body a pair of flow-control orifices in series when the valve element is displaced from closed position, one of said orifices having square-edged lands possessing a positive force-displacement characteristic with valve opening, and the other of said orifices having a configuration to provide a force-displacement characteristic approximating in magnitude but opposite in direction to that of the first-mentioned orifice, said other orifice discharging into an adjacent chamber in the movable valve element and cooperating chamber in the valve body, the movable valve element having at the entrance to the said downstream chamber therein an inwardly sloping surface disposed at an angle approximating the direction of the fluid flow into said chamber from the adjacent orifice, the movable valve element having at the end of said chamber remote from said orifice a surface inclined in the opposite direction to the entrance surface and at a substantially smaller angle than the angle of the entrance surface, and a curved surface intermediate the oppositely-inclined surfaces in said chamber of the movable valve element to carry the fluid flow smoothly from the entrance to the exit end of said chamber and the cooperating chamber in the valve body having at the end adjacent the orifice a surface sloping toward the movable valve element in the direction of the orifice, so that fluid is returned from the chamber in the valve body to the chamber in the movable valve element in the region adjacent said other orifice and at an angle having a flow component toward said orifice.

References Cited in the file of this patent

UNITED STATES PATENTS

| 1,716,881 | Francis | June 11, 1929 |
| 1,995,885 | Guttermuth | Mar. 26, 1935 |
| 2,134,803 | Rose | Nov. 1, 1938 |

FOREIGN PATENTS

| 589,937 | Germany | of 1933 |